United States Patent
Selvaraj et al.

(10) Patent No.: US 11,646,998 B2
(45) Date of Patent: May 9, 2023

(54) NETWORK ADDRESS TRANSLATION WITH FILTERS USING HIERARCHICAL RULES

(71) Applicant: Arista Networks, Inc., Santa Clara, CA (US)

(72) Inventors: Satish Kumar Selvaraj, San Jose, CA (US); Brett Hatch, Oakland, CA (US); Ashit Tandon, San Jose, CA (US); Deva Pandian, Sunnyvale, CA (US); Di Wang, Monte Sereno, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 29 days.

(21) Appl. No.: 17/004,676

(22) Filed: Aug. 27, 2020

(65) Prior Publication Data

US 2021/0367927 A1 Nov. 25, 2021

Related U.S. Application Data

(60) Provisional application No. 63/029,372, filed on May 22, 2020.

(51) Int. Cl.
*H04L 9/40* (2022.01)
*H04L 61/256* (2022.01)
*H04L 49/00* (2022.01)
*H04L 45/745* (2022.01)

(52) U.S. Cl.
CPC .... *H04L 63/0263* (2013.01); *H04L 45/74591* (2022.05); *H04L 49/3063* (2013.01); *H04L 61/256* (2013.01); *H04L 63/0236* (2013.01); *H04L 63/101* (2013.01)

(58) Field of Classification Search
CPC ............ H04L 63/0263; H04L 45/7457; H04L 49/3063; H04L 61/256; H04L 63/0236; H04L 63/101; H04L 61/2557; H04L 61/2514
See application file for complete search history.

(56) References Cited

U.S. PATENT DOCUMENTS

| | | | |
|---|---|---|---|
| 6,775,290 B1 * | 8/2004 | Merchant | H04L 12/4645 370/395.31 |
| 10,284,473 B1 * | 5/2019 | Sharma | H04L 63/0227 |
| 2002/0116521 A1 * | 8/2002 | Paul | H04L 47/20 709/233 |
| 2006/0092947 A1 * | 5/2006 | O'Keeffe | H04L 45/00 370/395.31 |
| 2008/0049752 A1 * | 2/2008 | Grant | H04L 45/00 370/392 |
| 2019/0327150 A1 * | 10/2019 | Hooda | H04L 67/306 |
| 2020/0053026 A1 * | 2/2020 | Rangachari | H04L 45/44 |
| 2021/0067448 A1 * | 3/2021 | Remen | H04L 69/22 |

* cited by examiner

*Primary Examiner* — Maung T Lwin
*Assistant Examiner* — Suman Debnath
(74) *Attorney, Agent, or Firm* — Fountainhead Law Group P.C.

(57) ABSTRACT

A system administrator can specify NAT mappings to perform NAT translations in a switch. The administrator can specify an ACL to filter packets to be translated. Filter rules generated from the ACL are stored in a first memory store in a switch and NAT rules generated from the NAT mappings are stored in a second memory store separate from the first memory store. When a packet matches one of the filter rules a tag that identifies the ACL is associated with the packet. When the tagged packet matches one of the NAT rules, the packet is translated according to the matched NAT rule.

20 Claims, 11 Drawing Sheets

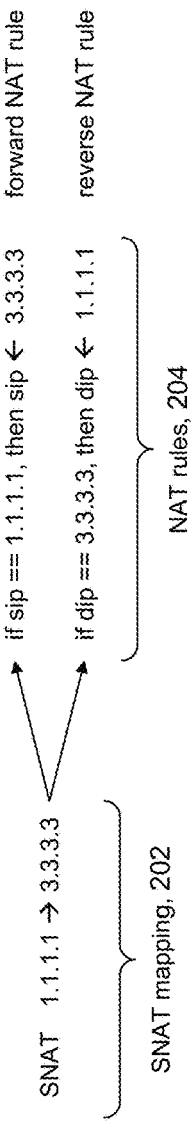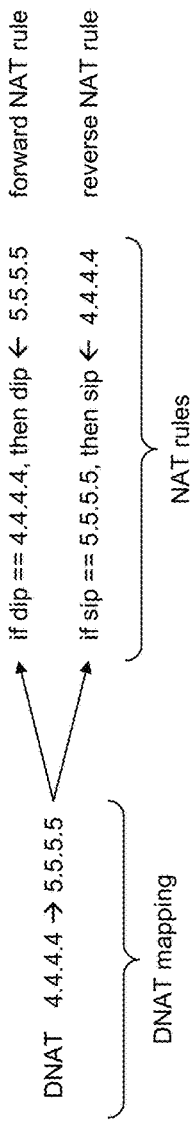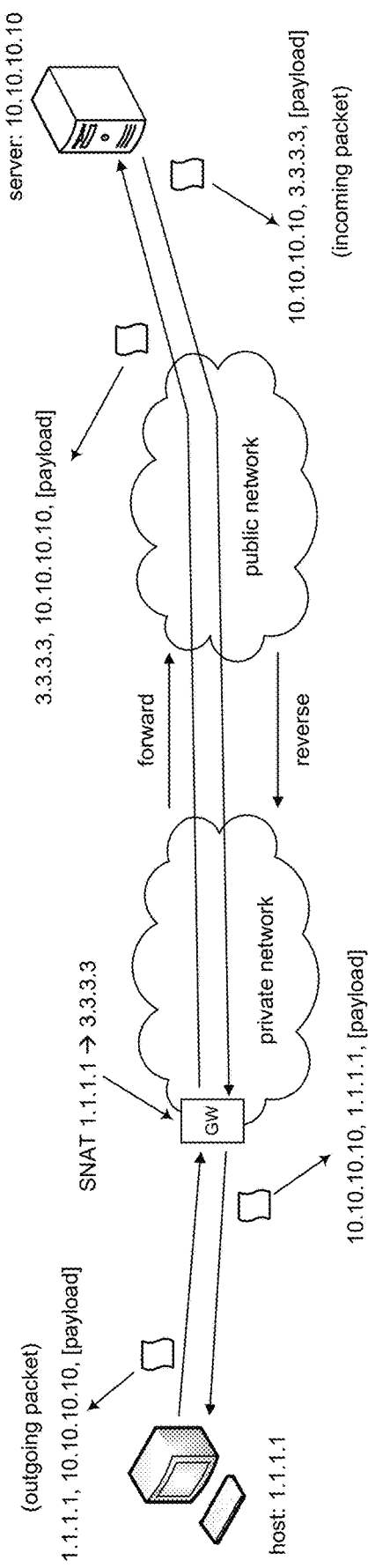

NETWORK ADDRESS TRANSLATION WITH FILTERS USING HIERARCHICAL RULES

CROSS REFERENCE TO RELATED APPLICATIONS

Pursuant to 35 U.S.C. § 119(e), this application is entitled to and claims the benefit of the filing date of U.S. Provisional App. No. 63/029,372 filed May 22, 2020, the content of which is incorporated herein by reference in its entirety for all purposes.

BACKGROUND

A common form of network translation involves a private network using addresses in a private range. The private network uses private addresses for computers that only have access to resources inside the network, like workstations needing access to file servers and printers. However, to access resources outside the network, e.g., the Internet, these computers have to have a public address so that computers outside of the private network can send responses back to computers inside the private network. Network address translation (NAT) is the process where a network device, e.g., a gateway or firewall, assigns a public address to a computer (or group of computers) inside a private network. NAT translation mappings can be qualified by access control lists (ACLs) so that only packets filtered by the ACL are translated by the NAT mapping.

BRIEF DESCRIPTION OF THE DRAWINGS

With respect to the discussion to follow and in particular to the drawings, it is stressed that the particulars shown represent examples for purposes of illustrative discussion and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIGS. 2A and 2B illustrate NAT mappings and NAT rules.

FIG. 3 shows an example of forward-direction and reverse-direction packets.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Figure 1:
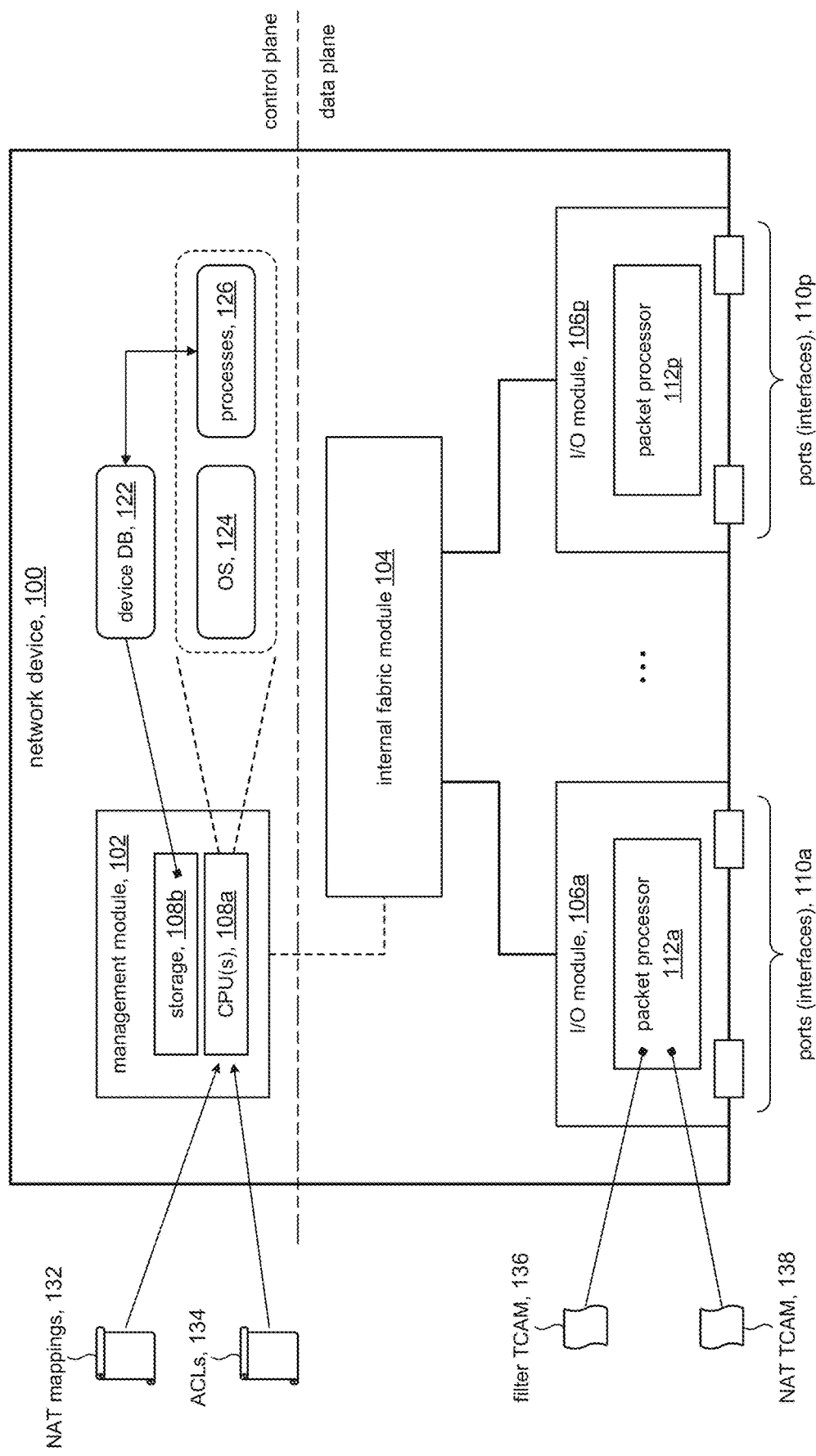
FIG. 1 illustrates a system block diagram in accordance with some embodiments.

FIG. 1 depicts an example of a network device (e.g., switch, router) in accordance with some embodiments of the present disclosure. As indicated in FIG. 1, network device 100 can include a management module 102, an internal fabric module 104, and one or more input/output (I/O) modules 106a-106p.

Management module 102 can provide a control plane facility (also referred to as control layer) for network device 100 and can include one or more management central processing units (CPUs) 108a for managing control plane operations of network device 100 in accordance with the present disclosure. Each management CPU 108a can be a general purpose processor, such as an Intel® x86 processor, an AMD® x86 processor, an ARM® processor etc., that operates under the control of software stored in a computer memory (not shown), such as dynamic random access memory (DRAM). The control plane is a well understood aspect of a network device and generally refers to functionality and processes to manage the device and determine data paths using for instance routing protocols, spanning tree, and the like.

Management module 102 can include suitable internal storage 108b. In some embodiments, storage 108b can comprise non-transitory computer-readable storage media to provide nonvolatile storage of data, data structures, computer-executable instructions, and so forth to operate management CPU(s) 108a in accordance with the present disclosure. For instance, internal data storage 108b can store various program and data modules, including for example, device database 122, operating system (OS) 124, processes 126, and so on. Device DB 122 can provide persistent storage for data (e.g., switch configurations, router configurations, forwarding tables, etc.) so that processes 126 can access it. OS 124 and processes 126 comprise computer-executable instructions which when executed by management CPU(s) 108a can cause the CPU(s) to perform operations described herein.

Management CPU(s) 108a can include a user interface facility to interact with a user (e.g., network administrator, a central controller, etc.) to configure and otherwise manage network device 100. In some embodiments, for instance, management CPU(s) 108a can receive network address translation (NAT) mappings 132 and access control lists (ACLs) 134 to control translation of network addresses between a source node (e.g., client machine) and a destination node (e.g., server).

Internal fabric module 104 and I/O modules 106a-106p collectively represent the data plane facility of network device 100 (also referred to as data layer, forwarding plane, etc.). Internal fabric module 104 is configured to interconnect the various other modules of network device 100. Each I/O module 106a-106p includes one or more input/output ports 110a-110p (also referred to as interfaces) on which ingress packets received and on which egress packets are transmitted. Each I/O module 106a-106p can also include a packet processor 112a-112p configured to process packets in accordance with the present disclosure. Each packet processor 112a-112p can comprise a forwarding hardware component (e.g., application specific integrated circuit (ASIC), field programmable array (FPGA), digital processing unit, graphics coprocessors, content-addressable memory, and the like) configured to make wire speed decisions on how to handle incoming (ingress) and outgoing (egress) network packets.

Each packet processor (see for instance 112a) can include several rules databases or memory stores that are used to identify certain packets in the network traffic and perform various actions on identified packets. Typically, a rules database is implemented in a high-speed memory in order to achieve wire-speed processing of packets. One type of high-speed memory is generally known as ternary content-addressable memory (TCAM) in which TCAM rules are stored. For discussion purposes, TCAMs will be used to describe various aspects of the present disclosure, although it will be appreciated that other table lookup technologies can be used.

In accordance with the present disclosure, each packet processor can include a TCAM that stores packet filter rules generated based on ACLs 134. This TCAM is shown in FIG. 1 as filter TCAM 136. Further in accordance with the present disclosure, each packet processor can include a separate TCAM that stores NAT rules generated based on NAT mappings 132 and the ACLs, and is depicted in FIG. 1 as NAT TCAM 138. The filter TCAM is named as such to emphasize that the TCAM contains packet filter rules (or simply "filter rules") that are based on the ACLs. In some embodiments, the filter TCAM may store only filter rules. In other embodiments, the filter TCAM can be a shared resource that stores rules other than filter rules to support other packet processing functionality. Likewise, the NAT TCAM is named as such to emphasize that the TCAM contains NAT rules. In some embodiments, the NAT TCAM can store only NAT rules. In other embodiments, the NAT TCAM can be a shared resource that stores rules other than NAT rules to support other packet processing functionality. It will be appreciated that in some embodiments, the underlying memory of NAT TCAM 138 can be an exact-match table rather than a TCAM. This aspect of the present disclosure is discussed below.

In general, a TCAM rule comprises match criteria for matching packets and one or more actions that are invoked when the match criteria are met. The match criteria can match various data in a packet, including for example source and destination addresses, source and destination ports, protocol type, data in the payload, and so on. Action(s) include dropping a packet, redirecting a packet, rewriting one or more fields in a packet, logging a message, and so on. For discussion purposes, a TCAM rule will be expressed as an IF-THEN statement:

IF <condition(s) are met>, THEN <perform action(s)> where the conditions in the IF portion represent one or more match criteria and the THEN portion expresses the action(s) performed on a matched packet.

Although NAT and ACLs are known techniques, the following brief overview is nonetheless presented in order to establish a common point of reference and some terminology for discussion purposes. NAT mappings (e.g., 132, FIG. 1) specify IP address translations to be performed. A user can specify a NAT mapping from a command line interface (CLI) on a switch. For example, the following command:

ip nat source 1.1.1.12 2.2.2.56 expresses a NAT mapping that would instruct the switch to translate outgoing packets having a source IP address of 1.1.1.12 to have a source IP address of 2.2.2.56. Note, NAT translations are exact matches; so, for example, a packet having a source IP address of 1.1.1.1 would not be translated by the above NAT mapping. NAT mappings can be performed on destination IPs. For example:

ip nat destination 4.4.4.14 5.5.5.54 expresses a NAT mapping to translate outgoing packets having a destination IP address of 4.4.4.14 to have a destination IP address of 5.5.5.54, again with the understanding that NAT translations are exact matches rather than prefix matches. It will be appreciated that NAT mappings can be represented in any suitable manner. A human user, for instance, can enter textual commands, such as the commands depicted above, to the switch, while a machine user (e.g., central control computer or other computer equipment) may transmit NAT mappings as textual or non-textual (e.g., binary codes) data to the switch.

In addition to translating the source or destination IP address, it is understood that NAT can translate other fields in the packet. For example, the Layer 4 (L4) port can be translated. The following:

ip nat source 1.1.1.1 100 2.2.2.2 200 represents a NAT mapping to translate the source IP from 1.1.1.1 to 2.2.2.2 and the L4 source port from 100 to 200. The following:

ip nat source 3.3.3.3 301 3.3.3.3 302 would effectively translate only the L4 source port.

NAT mappings can be instantiated in the TCAM in the switch as complementary pairs of NAT rules. Referring to FIG. 2A, for example, SNAT mapping 202 is a NAT mapping for translating a source IP address. The figure shows that the translation is instantiated as two NAT rules 204, a forward-direction NAT rule and a complementary reverse-direction NAT rule which would be stored in the TCAM. The "forward" direction can be the direction from a host in one network (e.g., a private network such as a home network, business LAN, data center, etc.) to a host on another network (e.g., a public network). As such, source IP addresses in packets sent in the forward direction are translated. Packets transmitted in the forward direction can be referred to as "outgoing packets." Conversely, the "reverse" direction can be the direction from the public network to the private network, where the destination IP address in a packet sent in the reverse direction is translated. Packets transmitted in the reverse direction can be referred to as "incoming packets." FIG. 2B illustrates a similar set of complementary NAT rules for a DNAT mapping to translate a destination IP address for incoming packets.

FIG. 3 illustrates an application of the forward- and reverse-direction rules for the SNAT mapping in FIG. 2A. The figure shows gateway GW configured for SNAT mapping. When the host (connected to the private network) at IP address 1.1.1.1 sends a packet to the server (connected on the public network) at IP address 10.10.10.10 via gateway GW, the gateway translates the source IP address in the outgoing packet according to the forward NAT rule. Conversely, when the server sends a packet to the host (reverse direction), gateway GW translates the destination IP address in the incoming packet according to the reverse NAT rule.

Turning now to access control lists, ACLs (e.g., 134, FIG. 1) can generally be used to select (or filter) specific packets in the traffic stream. An ACL comprises a list of packet filters (or simply "filters"). Generally, each filter in an ACL informs the switch to either allow a packet to remain in the packet stream (PERMIT action) or drop the packet from the packet stream (DENY action). A packet can be identified based on an address component of the packet, such as MAC address or IP address, in either the source and/or destination direction. For purposes of the present disclosure, ACL filters of the following form will be used:

permit IP src dst, where the action is the PERMIT action, and where one address field (src or dst) specifies an IP address and the other address field specifies the label "any". Consider, for example, an ACL with the following list of filters:

permit IP any 10.10.10.0/24
permit IP any 20.20.20.0/24
permit IP any 30.30.30.0/24

The source address field in each filter is set to the "any" label so there is no selectivity based on source IP. Accordingly, these filters match only on the destination IP addresses, namely 10.10.10.0/24, 20.20.20.0/24, and 30.30.30.0/24. Conversely, an ACL with the following list of filters matches on specific source IP addresses, namely 50.50.50.0/24, and 60.60.60.0/24:

permit IP 50.50.50.0/24 any
permit IP 60.60.60.0/24 any

The slash notation ("/") is known and is called classless inter-domain routing (CIDR) notation. CIDR notation is used to specify a subnet prefix. For example, the filter permit IP 50.50.50.0/24 any will match on the following range of source IP addresses: 50.50.50.0 to 50.50.50.255.

For completeness, it is noted that other filter actions (e.g., DENY) are possible. Also, MAC addresses can be specified instead of IP addresses.

ACLs can be combined with NAT mappings to qualify the packets that are translated. For example, consider the NAT mapping:

SNAT 1.1.1.1→3.3.3.3, which has the following corresponding forward- and reverse-direction NAT rules:

if src==1.1.1.1, then src←3.3.3.3
if dst==3.3.3.3, then dst←1.1.1.1 where src refers to source IP address and dst refers to destination IP address. By themselves, the NAT rules cause the switch to translate every packet that has the targeted address. An ACL can qualify the NAT rules so that address translation is performed only on packets that are filtered (selected) by the ACL. For example, this can be expressed by the following CLI command:

ip nat source 1.1.1.1 access-list my-nat-acl 2.2.2.2 where the translation of source IP address 1.1.1.1 is performed only on packets that match the filters in the ACL identified as "my-nat-acl". Stated another way, an ACL can filter the traffic according to its filters so that only the filtered traffic is translated by the NAT rules. The discussion will now turn to this aspect of the present disclosure.

Figure 4A:
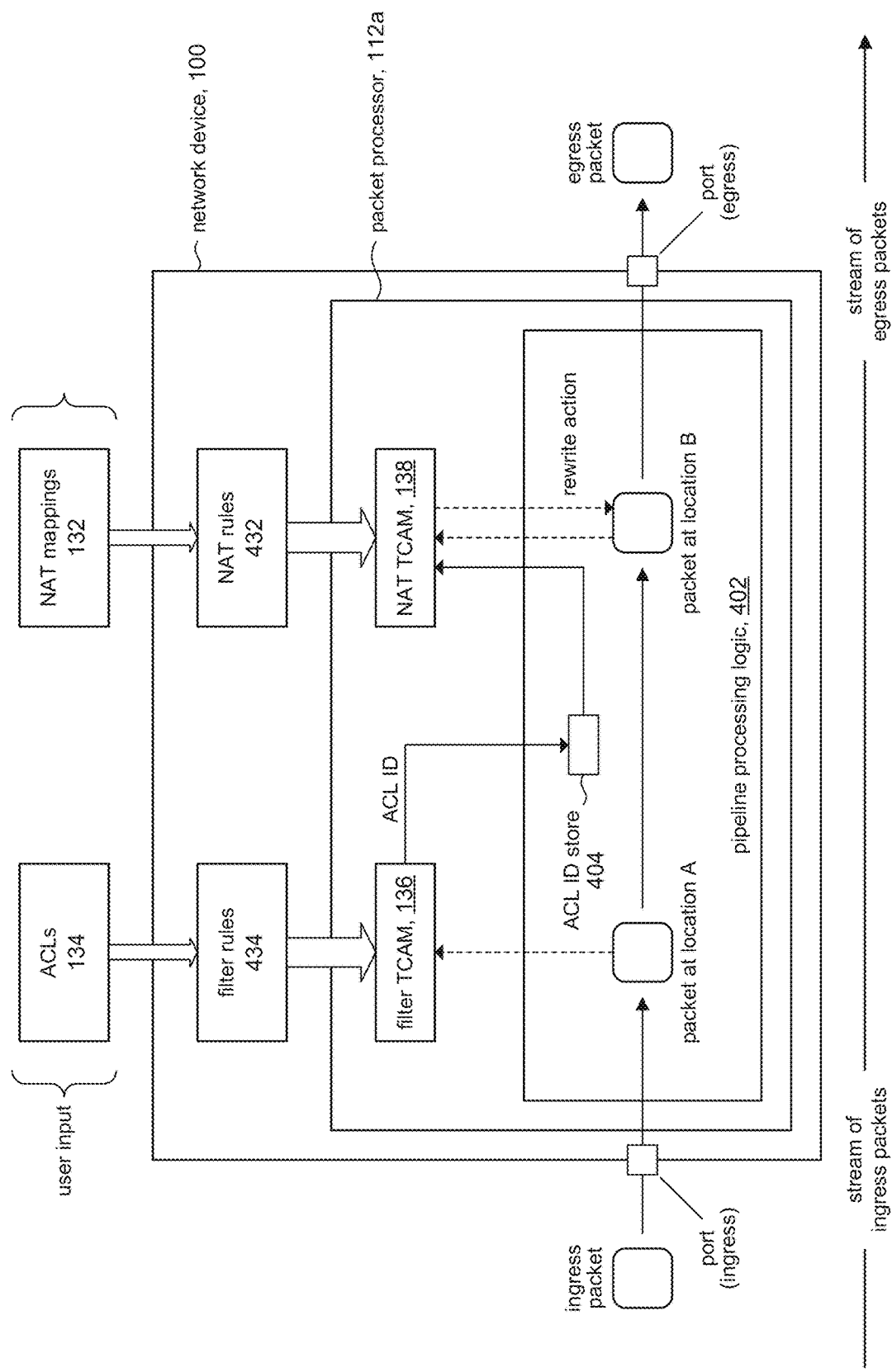
FIG. 4A illustrates details of a packet processor in accordance with some embodiments of the present disclosure.

Referring now to FIG. 4A, additional details of a packet processor (e.g., 112a) in a network device (e.g., 100) in accordance with the present disclosure are described. NAT mappings 132 and ACLs 134 (e.g., received from a user) can be used to generate NAT rules 432, which can be programmed into NAT TCAM 138. Likewise, the ACLs can be used to generate filter rules 434, which can be programmed into filter TCAM 136.

In some embodiments, packet processor 112a can include pipeline processing logic 402 to receive and process an ingress packet and to emit an egress packet for transmission. Pipeline processing logic 402 can receive an ingress packet and, in accordance with the present disclosure, provide the packet downstream to filter TCAM 136 at process location A. The filter TCAM can output an ACL identifier on a matched packet to ACL ID data store 404 based on the packet contents provided to the filter TCAM. Further downstream at processing location B, pipeline processing logic 402 can provide the packet to NAT TCAM 138. Based on the packet contents and data stored in ACL ID data store 404, NAT TCAM 138 can cause a REWRITE action to be invoked on a matched packet to perform the address translation. In some embodiments, for instance, the NAT TCAM itself can invoke the REWRITE action. In other embodiments, the NAT TCAM can output metadata that the pipeline processing logic can use to invoke the REWRITE action downstream. In accordance with the present disclosure, the match criteria include the datum stored in ACL ID data store 404. Pipeline processing logic 402 can continue processing the packet to produce an egress packet to be transmitted. It will be appreciated that in other embodiments, a packet processor can include multiple instances of pipeline processing logic 402 that operate in parallel.

Figure 4B:
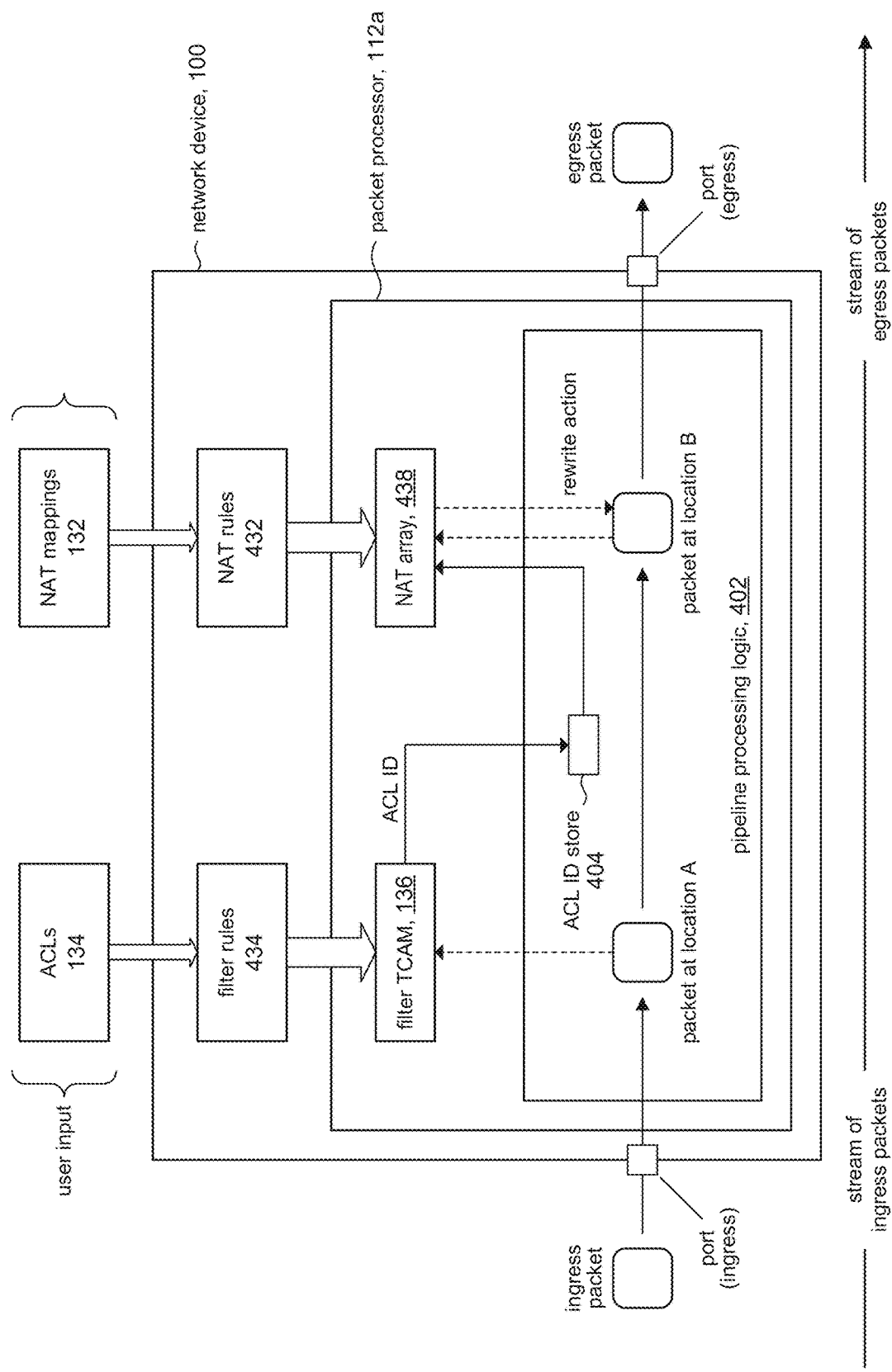
FIG. 4B illustrates details of a packet processor in accordance with some embodiments of the present disclosure.

Referring to FIG. 4B, in some embodiments, the underlying memory that stores NAT rules 432 can be other than a TCAM. TCAMs allow for wildcard matching by providing a "don't care" logic state in addition to logic 0 and logic 1 states. This enables TCAMs to perform broader searches based on pattern matching. Accordingly, TCAMs are especially suited to storing the filter rules (e.g., filter TCAM 136) of an ACL because ACLs typically specify ranges of addresses, which calls for a prefix match. NAT rules match on an entire IP address (e.g., source IP and/or the destination IP) and so do not require the wildcard capability and hence additional circuit complexity of a TCAM.

Accordingly as illustrated in FIG. 4B, in some embodiments, the NAT rules can be stored in NAT array 438. The array, for example, can be an associative array which is also commonly referred to as a map or a dictionary and which performs exact-match searches using only logic 0's and logic 1's. An associative array comprises storage of a collection of key/value pairs with the property that every key can appear at most once—no duplicates. An associative array can be implemented in hardware. One way, for example, is to use a hardware hash table (e.g., implemented on an application specific integrated circuit, ASIC). Another example is called a binary content addressable memory (BCAM), which is similar to a TCAM but without the ability to mask bits. The remaining discussion will refer to a TCAM for storing NAT rules with the understanding that NAT rules can be stored in a memory store that provides exact-match capability, such as an associative array.

Figure 5:
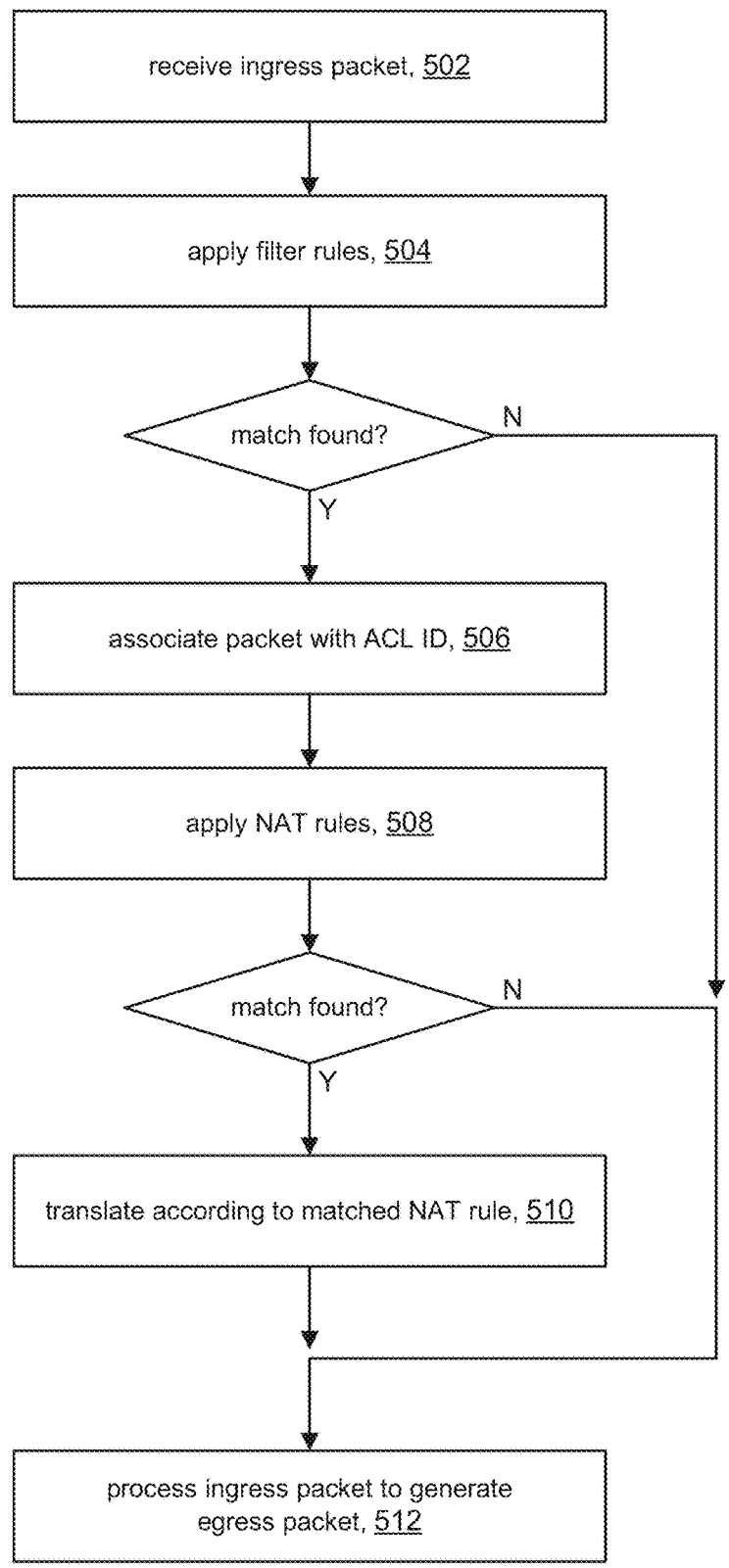
FIG. 5 illustrates operations in accordance with the present disclosure.
Figures 6A, 6B:
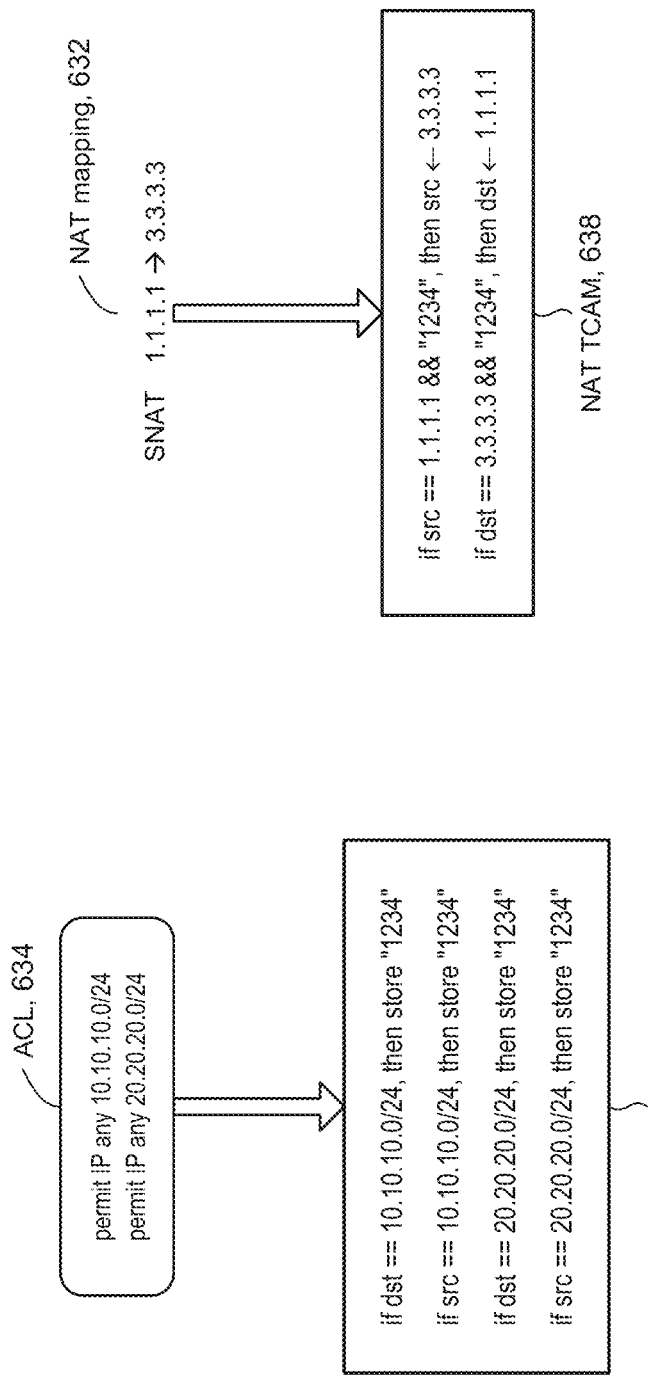
FIGS. 6A and 6B illustrate examples of a filter TCAM and a NAT TCAM in accordance with the present disclosure.

Referring to FIGS. 5, 6A, and 6B, the discussion will now turn to a high-level description of processing in a network device (e.g., 100, FIGS. 1 and 4A & 4B) for processing NAT mappings that are qualified by ACLs in accordance with the present disclosure. In some embodiments, pipeline processing logic (e.g., 402) in the network device can include one or more digital processing units, which when operated, can cause the pipeline processing logic to perform processing in accordance with FIG. 5. Digital processing units can include specialized processors such as digital signal processors (DSPs), graphics coprocessors, field programmable arrays, application specific integrated circuits (ASICs), etc. that operate by way of executing computer program code or operate by way of being configured for specific operations (e.g., the pipeline processing logic can be a specialized processor).

The following discussion will reference the example shown in FIGS. 6A and 6B where a user specifies NAT mapping 632 to translate outgoing packets having a source IP address of 1.1.1.1 to 3.3.3.3. The NAT mapping is further qualified by ACL 634 (also provided by the user) so that NAT mapping is performed only on packets that match one of the filters in the ACL. For example, in the example shown in FIGS. 6A and 6B, NAT mapping is qualified so that translation is performed on outgoing packets whose destination addresses are in the 10.10.10.0 network or in the 20.20.20.0 network.

Returning to FIG. 5, at operation 502, the pipeline processing logic can receive an ingress packet. In some embodiments, an ingress packet received on a port on the network device can be provided to the pipeline processing logic to process the received packet.

At operation 504, the pipeline processing logic can determine if the received packet matches one of the filter rules. In some embodiments, for example, the received packet can be provided or otherwise presented to the filter TCAM (e.g., 136). The filter TCAM can match the IP address fields (source and destination) in the received packet against each filter rule that is programmed in the TCAM. Referring for a moment to the example shown in FIG. 6A. ACL 634 comprises two filters, which PERMIT any packet that has a destination IP address on the 10.10.10.0 network or the 20.20.20.0 network. In other words, such packets will remain in the traffic stream. In accordance with the present disclosure, the following pairs of filter rules can be generated from each of two filters and programmed in filter TCAM 636:
  if dst==10.10.10.0/24, then store "1234"
  if src==10.10.10.0/24, then store "1234"
  if dst==20.20.20.0/24, then store "1234"
  if src==20.20.20.0/24, then store "1234"
where,
  "1234" is an ACL identifier that is uniquely associated with the ACL. In the case of multiple ACLs, a unique identifier would be associated with each ACL. In some embodiments, the identifier can be an integer value. More generally, however, the identifier can be any suitable kind of data.
  the STORE action is discussed below.

Note that each filter in ACL yields two filter rules. Accordingly, an ACL containing F filters will result in 2×F filter rules that are programmed into the filter TCAM. Recall that a NAT mapping corresponds to two complementary NAT rules: a rule for forward-direction (outgoing) packets and a rule for reverse-direction (incoming) packets; see, for instance, the two NAT rules shown in FIG. 6B. In accordance with some embodiments, filter rules are likewise programmed in the filter TCAM in complementary pairs, one rule to filter (select) outgoing packets and one rule to filter incoming packets. This aspect of the present disclosure is discussed further below.

Continuing with the description of operation 504, if the received packet matches a filter rule in the filter TCAM, then processing can continue to operation 506. If a match is not found, then processing can continue at operation 512.

At operation 506, the pipeline processing logic can associate the received packet with the ACL ID obtained from the matched filter rule. In some embodiments, for example, each filter rule can include a STORE action to store the ACL ID into ACL ID data store 404 (FIGS. 4A & 4B), thereby associating "1234" with the received packet.

At operation 508, the pipeline processing logic can determine if the received packet matches one of the NAT rules. Referring for a moment to the example shown in FIG. 6B. In accordance with the present disclosure, NAT mapping 632 results in the following pair of complementary NAT rules in NAT TCAM 638:
  if src==1.1.1.1 && "1234", then src←3.3.3.3
  if dst==3.3.3.3 && "1234", then dst←1.1.1.1
In accordance with the present disclosure, each NAT rule includes the criterion that the rule matches the ACL ID associated with the ACL that qualifies the NAT mapping. In this example, the ACL ID is "1234".

The NAT TCAM can match for a NAT rule using both an IP address field (source or destination) in the received packet and the ACL ID that is associated with the received packet. In some embodiments, as shown in FIGS. 4A & 4B for example, the ACL identifier stored in ACL ID data store 404 can be provided as an input to the NAT TCAM in synchrony with arrival of the received packet at the TCAM. The NAT TCAM can then perform a match using both the contents (e.g., an IP address) of the received packet and the content of ACL ID data store 404. If a match is found, then processing can continue to operation 510. If a match is not found, then processing can continue to operation 512.

At operation 510, the pipeline processing logic can translate the source or destination address in the received packet according to the rewrite action in the matched NAT rule. For example, in the case of an outgoing packet, the rewrite action will translate the source IP address in the packet, and for an incoming packet the rewrite action will translate the destination IP address in the packet.

At operation 512, the pipeline processing logic can generate an egress packet. This can include actions and operations in addition to the NAT translation processing described above. Packet processing in accordance with the present disclosure can be deemed complete.

Figure 7:
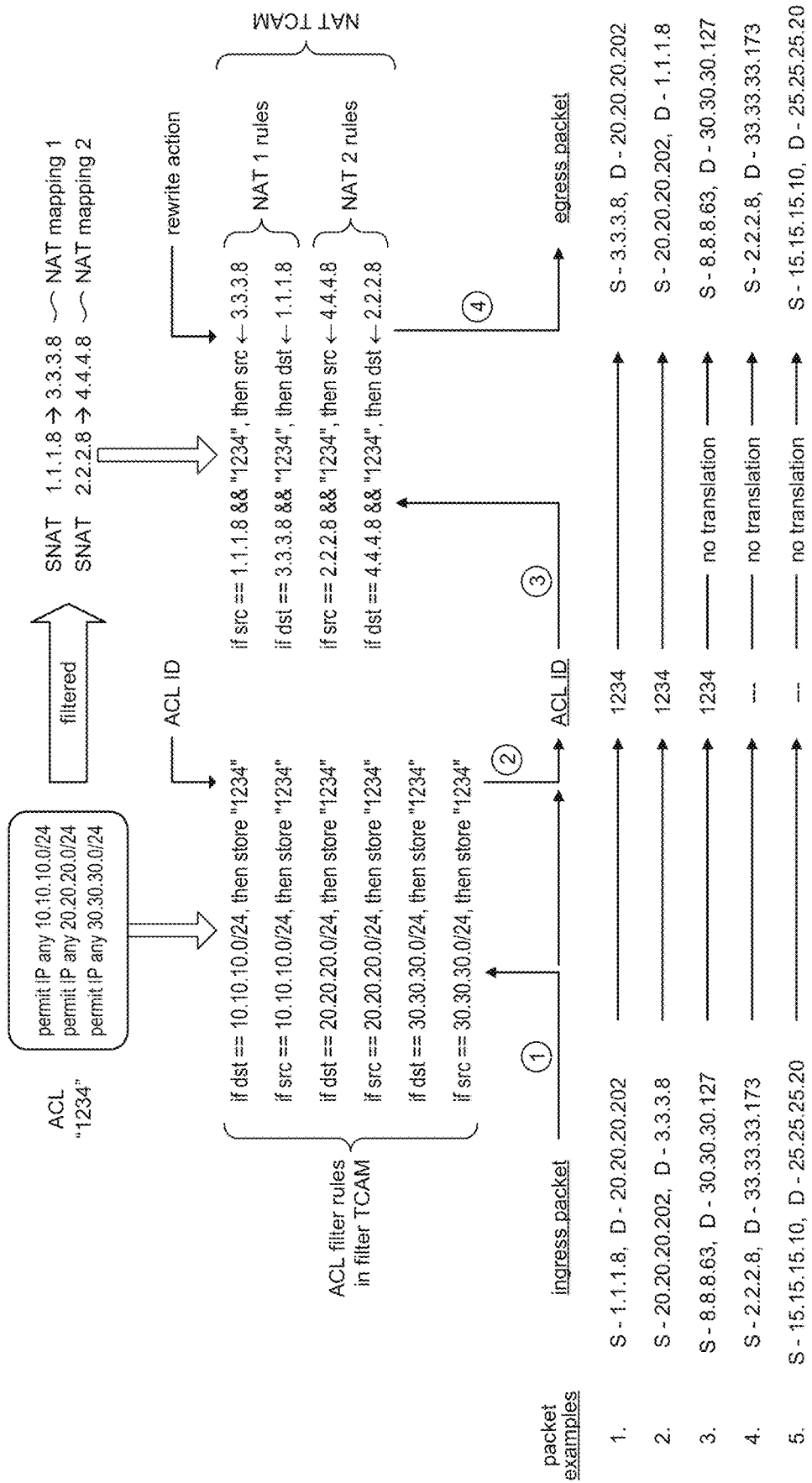
FIG. 7 shows examples of processing packets in accordance with the present disclosure.

Referring now to FIG. 7, examples are shown to illustrate the operations in FIG. 5. The example shows two source NAT mappings 1 and 2. An ACL comprising three filters and identified as "1234" is used to filter the packets to be translated. The ACL qualifies the NAT mappings. In accordance with the present disclosure, the three filters result in three pairs of complementary filter rules in the filter TCAM. Further in accordance with the present disclosure each NAT mapping results in a pair of complementary NAT rules in the NAT TCAM.

The circled numbers in the figure summarizes the operations for processing filtered NATs. At '1', an ingress packet is provided to the filter TCAM. At '2', if a matching filter rule is found, the ACL identifier associated with the matched filter rule is associated with the ingress packet (e.g., stored into ACL ID data store 404, FIGS. 4A & 4B). At '3', both the ingress packet and the ACL ID are provided to the NAT TCAM. At '4', if a matching NAT rule is found, the rewrite action associated with the matched NAT rule is applied to translate the address in the ingress packet to produce an egress packet.

FIG. 7 shows several configurations of ingress packets to illustrate various aspects of processing filtered NATs in accordance with the present disclosure:

Packet Example 1

This example can represent a use case where a host with IP address 1.1.1.8 in a private network sends a packet to a server with IP address 20.20.20.202 over a public network, similar to the configuration in FIG. 3 for example. The received ingress packet from the host will have a source IP address 1.1.1.8, which will match the third filter rule in the filter TCAM, namely
  if dst==20.20.20.0/24, then store "1234".
The ACL ID in the matched filter rule will be output and together with the received packet will match the first NAT rule in the NAT TCAM, namely
  if src==1.1.1.8 && "1234", then src←3.3.3.8.
The rewrite action will generate an egress packet with source IP 3.3.3.8. The destination IP is unchanged, and so the packet will be forwarded to the server at 20.20.20.202. This example shows that the process of applying ingress filters to both the filter TCAM and the NAT TCAM is effectively filtering ingress packets by the ACL to be translated by the NAT mapping.

Packet Example 2

This example represents a continuation of Packet Example 1, where the server (at 20.20.20.202) transmits a response packet to the host using the translated address of 3.3.3.8. The ingress packet received from the public network has a source IP address of the server and a destination IP of the host. The received packet will match the fourth filter rule in the filter TCAM, namely if src==20.20.20.0/24, then store "1234".

The ACL ID will be output and together with the received packet will match the second NAT rule in the NAT TCAM, namely if dst==3.3.3.8 && "1234", then dst←1.1.1.8.

The rewrite action will generate an egress packet having a destination IP of 1.1.1.8, and so the packet will be forwarded to the host. This example and example 1 illustrate the function of the complementary pair of filter rules and the complementary pair of NAT rules.

Packet Example 3

In this example, the ingress packet matches the fifth filter rule, namely if dst==30.30.30.0/24, then store "1234".

However, none of the NAT rules match; there is no NAT mapping for source IP address 8.8.8.63. Accordingly, the ingress packet is not translated insofar as NAT translation is concerned.

Packet Example 4

In this example, the ingress packet does not match any of the filter rules. Accordingly, no ACL ID is output. However, there is a match with a NAT rule, namely if src==2.2.2.8 && "1234", then src←4.4.4.8.

Despite the source IP address being a candidate for NAT translation, there is no match with the ACL ID (because there is no ACL ID) and so the NAT translation will not occur. Accordingly, the ingress packet is not subject to NAT translation. This example shows the filtering action of the ACL, where a packet that does not match an ACL filter is filtered out and not translated by a NAT mapping.

Packet Example 5

In this example, the ingress packet does not match any filter rule or any NAT rule. The packet is not subject to NAT translation because the filter TCAM did not output an ACL ID.

Figure 8A:
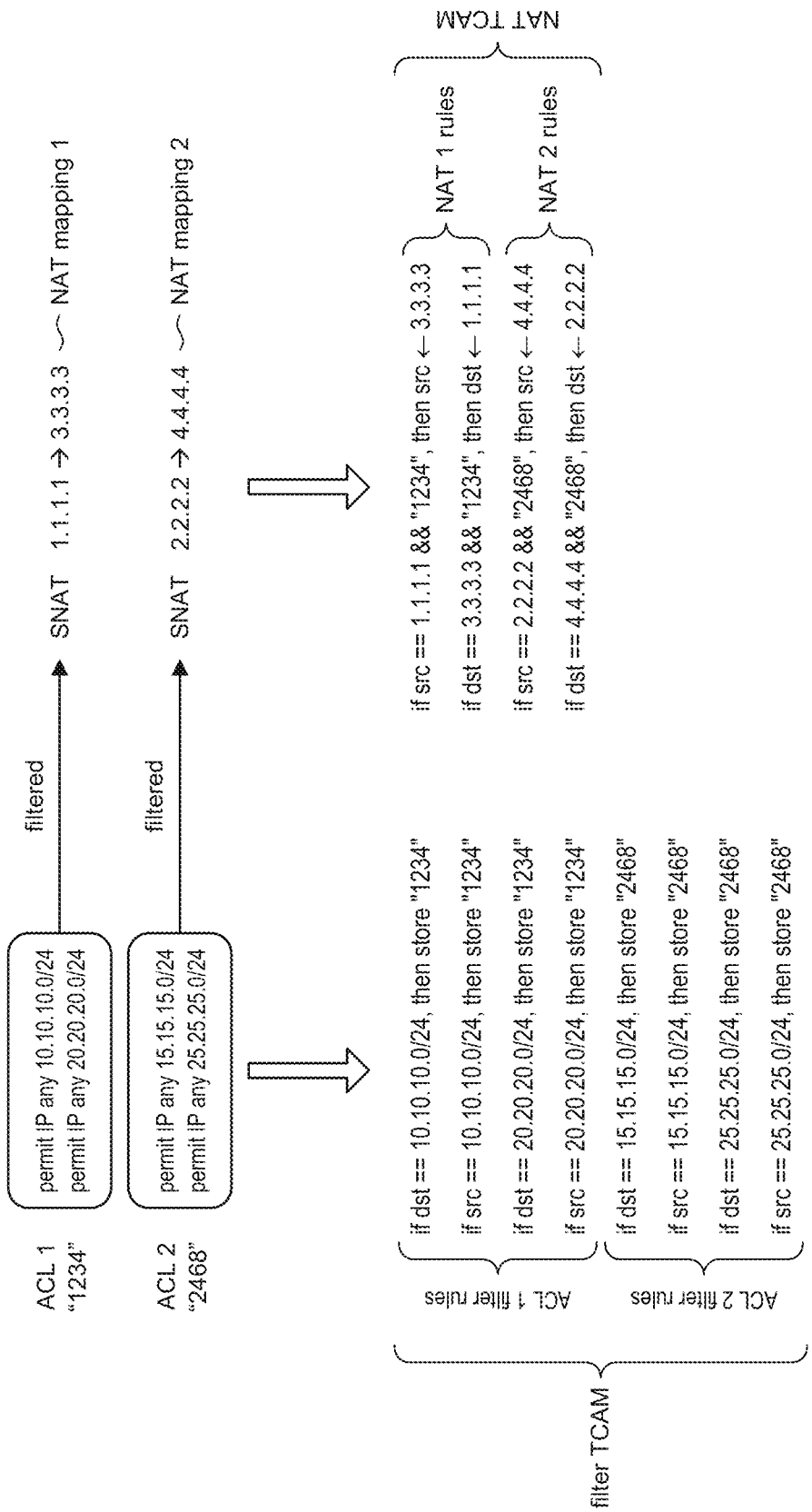
FIGS. 8A and 8B show additional examples of a filter TCAM and a NAT TCAM in accordance with the present disclosure.

FIG. 8A shows a configuration with multiple ACLs. Each ACL serves to filter packets for a corresponding NAT mapping; ACL 1 filters packets for NAT mapping 1 and ACL 2 filters packets for NAT mapping 2. FIG. 8A shows that each ACL is associated with its own ACL identifier and further shows that each filter rule in a given ACL (e.g., ACL 2) is associated with that ACL's identifier (e.g., "2468"). Each complementary pair of NAT rules specifies the ACL identifier of the ACL that is used to filter packets to be translated. For example, the complementary pair of NAT rules for NAT mapping 1 specify the ACL identifier "1234", while the complementary pair of NAT rules for NAT mapping 2 specify the ACL identifier "2468".

Figure 8B:
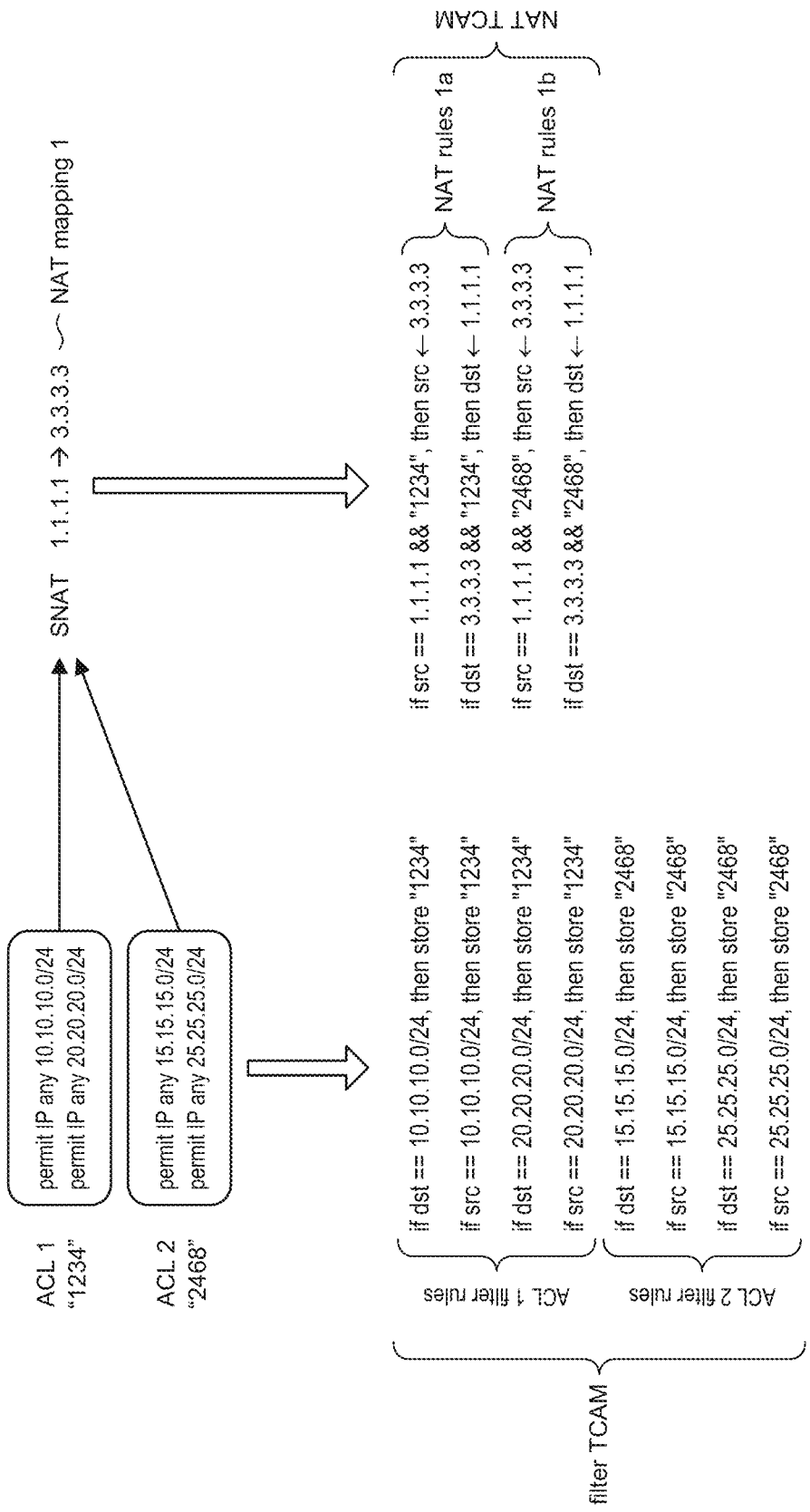

FIG. 8B shows a configuration, in accordance with some embodiments, where two ACLs are used to filter one NAT mapping. The figure shows two pairs of complementary pairs of NAT rules, rules 1a and rules 1b. Each complementary pair of NAT rules is defined using the ACL identifier of one of the ACLs. For example, NAT rules 1a will match on ACL identifier "1234" and NAT rules 1b will match on ACL identifier "2468".

As a comparison, conventional storage strategies store filtered NAT translation rules in a single TCAM. As explained above, a NAT mapping results in two NAT rules, a forward-direction rule and a reverse-direction rule. If an ACL is used to filter packets for translation, conventional strategies incorporate the ACL filters by making a copy of a NAT rule and qualifying the copied NAT rule with one of the ACL filters. A NAT rule is copied for each ACL filter, and this is done for both NAT rules in the complementary pair. This can result in a significant amplification of the number of rules that have to be programmed in the single TCAM. Consider, for instance, the NAT translation configuration shown in FIG. 7 having the following NAT mappings:

SNAT 1.1.1.8→3.3.3.8
SNAT 2.2.2.8→4.4.4.8

The NAT mappings result in the following two NAT rules:

1. Forward rule—if src==1.1.1.8, then src←3.3.3.8
2. Reverse rule—if dst==3.3.3.8, then dst←1.1.1.8
3. Forward rule—if src==2.2.2.8, then src←4.4.4.8
4. Reverse rule—if dst==4.4.4.8, then dst←2.2.2.8

The ACL comprises the following three filters:

A. permit IP any 10.10.10.0/24
B. permit IP any 20.20.20.0/24
C. permit IP any 30.30.30.0/24

Conventional storage strategies may combine the NAT mapping and ACL in a single TCAM with the following rules:

1a. Forward rule—if src==1.1.1.8 && dst==10.10.10.0/24, then src←3.3.3.8
1b. Forward rule—if src==1.1.1.8 && dst==20.20.20.0/24, then src←3.3.3.8
1c. Forward rule—if SIC==1.1.1.8 && dst==30.30.30.0/24, then src←3.3.3.8
2a. Reverse rule—if dst==3.3.3.8 && src==10.10.10.0/24, then dst←1.1.1.8
2b. Reverse rule—if dst==3.3.3.8 && src==20.20.20.0/24, then dst←1.1.1.8
2c. Reverse rule—if dst==3.3.3.8 && src==30.30.30.0/24, then dst←1.1.1.8
3a. Forward rule—if src==2.2.2.8 && dst==10.10.10.0/24, then SIC←4.4.4.8
3b. Forward rule—if src==2.2.2.8 && dst==20.20.20.0/24, then src←4.4.4.8
3c. Forward rule—if SIC==2.2.2.8 && dst==30.30.30.0/24, then src←4.4.4.8
4a. Reverse rule—if dst==4.4.4.8 && src==10.10.10.0/24, then dst←2.2.2.8
4b. Reverse rule—if dst==4.4.4.8 && src==20.20.20.0/24, then dst←2.2.2.8
4c. Reverse rule—if dst==4.4.4.8 && src==30.30.30.0/24, then dst←2.2.2.8

NAT rule 1 is duplicated as rules 1a, 1b, and 1c, which are respectively qualified by filters A, B, and C. Likewise, NAT rule 2 is duplicated as rules 2a, 2b, and 2c, and (are respectively qualified by filters A, B, and C, and so on for a total of twelve rules consuming twelve TCAM entries. The total number of entries can be computed from the number of NAT rules and the number filters as:

$$\text{number of TCAM entries} = R \times F,$$

where, R is the total number of NAT rules from the NAT mappings, and

F is the total number of filters among the ACLs.

In our example, we have four NAT rules (from the two NAT mappings) and three filters in the ACL, for a total of 4×3=12 TCAM entries.

By comparison, the dual-TCAM configuration in accordance with the present disclosure shown in FIG. 7 results in ten rules. In accordance with the present disclosure, the number of TCAM entries can be computed by:

number of TCAM entries=R+(2×F), where, R is the total number of NAT rules among the NAT mappings, and F is the total number of filters among the ACLs It is clear that with larger configurations of filtered NAT translations, the number of TCAM entries grows faster using a conventional single-TCAM storage strategy as compared to the dual-TCAM configuration in accordance with the present disclosure. In the example above, the four NAT rules from the two NAT mapping and the three ACL filters requires 12 rules (conventional approach) vs. 10 rules (per the present disclosure). The disparity becomes more pronounced when larger numbers of NAT mappings and more and/or larger-sized ACLs are involved. For example, a configuration that requires 50 NAT rules (i.e., 25 NAT mappings) and 100 filters distributed across several ACLs is not atypical. A conventional storage strategy using single-TCAM configuration would require 5,000 entries. By comparison, a dual-TCAM configuration in accordance with the present disclosure uses a total of (50+2×100)=250 entries. In general, the single-TCAM configuration requires a quadratic number of entries, since it is the product of 2 variables. On the other hand, the dual-TCAM configuration only uses a linear number of entries, since it is the sum of 2 variables. Mathematically, it is well-understood that as the scales increase, a linear relationship grows more slowly than a quadratic one, and that this gap only grows as the scale increases. At large scales, the difference can be very dramatic, as the foregoing examples illustrate. A dual-TCAM configuration in accordance with the present disclosure can represent a significant reduction in consumed TCAM resources as compared to single-TCAM configurations.

Figure 9:
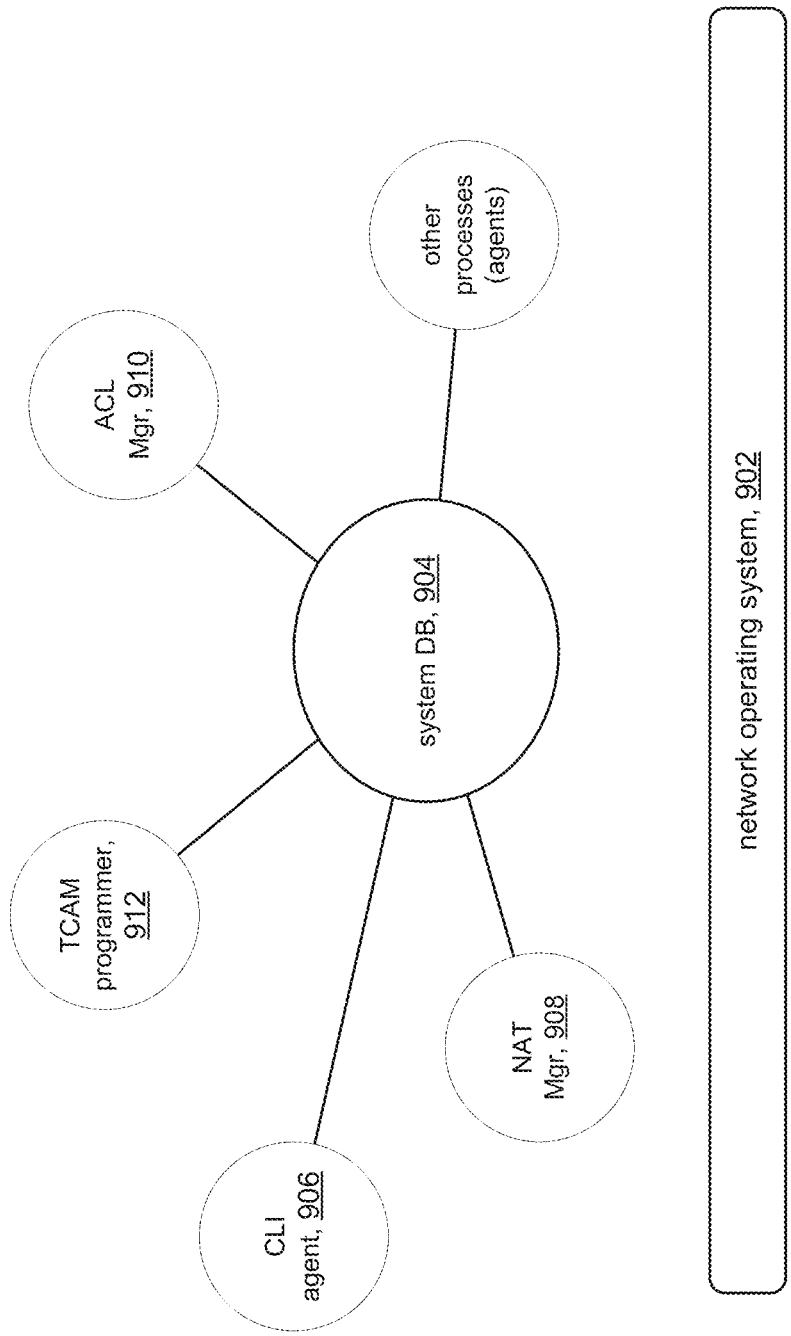
FIG. 9 illustrates a software configuration in accordance with the present disclosure.

FIG. 9 shows a software architecture to process the NAT mappings and ACLs to program the NAT TCAM and filter TCAM in accordance with some embodiments of the present disclosure. In some embodiments, the software architecture can execute in the control plane of a network device (e.g., 100) such as a switch or router. Network operating system (OS) 902 can provide OS-level services to support various processes (agents) executing on the network OS. System DB 904 can receive and persist state information on the current operating state of the network device and provide that information to various processes executing on the network OS. State information can include operating status of the network device (e.g., up/down state of ports), forwarding tables, routing tables, etc. In some embodiments, system DB 904 can synchronize state information by receiving and storing state information from processes (agents) executing on OS 902 and signaling appropriate processes when the state information changes.

One such process can be CLI agent 906 to provide command line interface (CLI) access to the network device. A user can access CLI agent 906 to input the NAT mappings and ACLs to configure filtered NAT translations on the network device. CLI agent 906 can store the input as state information in system DB 904. NAT manager 908 can process a received NAT mappings to generate NAT rules to be programmed in a TCAM (e.g., NAT TCAM 138, FIG. 1). NAT manager 908 can store the NAT rules in system DB 904. ACL manager 910 can process received ACLs to generate filter rules to be programmed in another TCAM (e.g., filter TCAM 134). ACL manager 910 can store the filter rules in system DB 904. TCAM programmer 912 can program the generated NAT rules and filter rules into the NAT and filter TCAMs, respectively.

Figure 10:
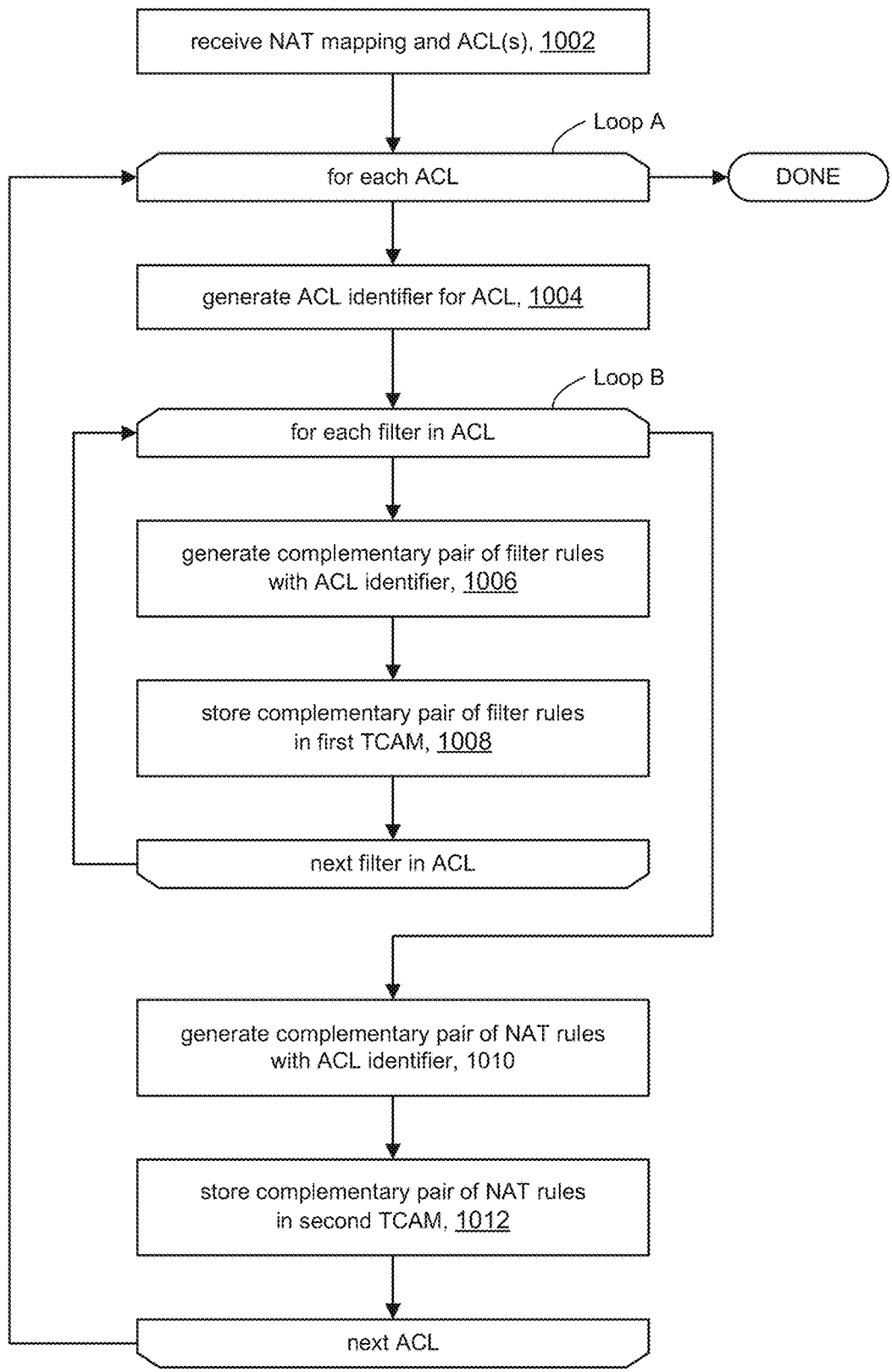
FIG. 10 shows processing to generate filter and TCAM rules in accordance with the present disclosure.

Referring to FIG. 10, the discussion will now turn to a high-level description of processing in a network device (e.g., 100, FIGS. 1 and 4A & 4B) for generating rules from NAT mapping and ACLs in accordance with the present disclosure. In some embodiments, for example, agents (e.g., 906, 908, 910, 912 in FIG. 9) executing in the management module (e.g., 102, FIG. 1) of the network device, can receive and process NAT mappings and ACLs to produce filter rules and NAT rules in accordance with the present disclosure. The flow of operations performed by the agents is not necessarily limited to the order of operations shown.

At operation 1002, one of the agents (e.g., client agent 906) can receive a NAT mapping to perform address translation and one or more ACLs to filter packets in the packet stream for address translation. In some embodiments, for example, the client agent can provide a suitable user interface (e.g., a command line interface) for a user to specify the NAT mapping and ACL(s). The client agent can persist the received NAT mapping and associated ACL(s) into system DB 904. In response, system DB 904, can signal NAT manager 908 and ACL manager 910 to process the NAT mapping and ACL(s), respectively. Each received ACL can be processed by ACL manager 910 in processing loop A as follows:

At operation 1004, one of the agents (e.g., ACL manager 910) can generate a unique ACL identifier to identify the ACL. The identifier can be an integer or any other suitable data value. The ACL contains one or more filters to identify packets to be filtered. Each filter in the ACL can be processed in processing loop B as follows:

At operation 1006, one of the agents (e.g., ACL manager 910) can generate a complementary pair of filter rules from the filter. As explained above, the filter needs to match packets in the forward direction and packets in the reverse direction. If the filter in the ACL specifies a source IP address, then the forward filter rule will match the IP address in the source IP data field of the packet in order to match forward direction packets. The reverse filter rule will match for the IP address in the destination field of the packet in order to filter reverse direction packets. FIG. 3 illustrates an example of forward and reverse direction packet flow. In accordance with the present disclosure, the action associated with the filter rule is a STORE action to store the ACL identifier in a data store (e.g., ACL ID data store 404, FIGS. 4A & 4B). For example, the filter:

permit IP any 10.10.10.0/24 can generate the complementary filter rules:

if dst=10.10.10.0/24, then store "1234"

if src=10.10.10.0/24, then store "1234".

where "1234" is the ACL identifier. The ACL manager can store the generated filter rules in system DB 904. In response, system DB 904 can signal TCAM manager 912 to initiate programming the filter rules.

At operation 1008, one of the agents (e.g., TCAM manager 912) can program the complementary pair of filter rules in a first TCAM (e.g., filter TCAM 136, FIG. 1). Processing can return to the top of processing loop B to process the next filter in the ACL.

At operation 1010, upon completion of Loop B, one of the agents (e.g., NAT manager 908) can generate a complementary pair of NAT rules from the NAT mapping in order to match packets in the forward direction and packets in the reverse direction. In accordance with the present disclosure, the ACL identifier associated with the ACL (operation 1004) is part of the match criteria in the NAT rules. For example, the NAT mapping:

NAT mapping 1.1.1.8→3.3.3.8 can generate the complementary NAT rules:

if src==1.1.1.1 && "1234", then src←3.3.3.3
if dst==3.3.3.3 && "1234", then dst←1.1.1.1 where "1234" is the ACL identifier. The NAT manager can store the generated NAT rules in system DB 904. In response, system DB 904 can signal TCAM manager 912 to program the NAT rules.

At operation 1012, one of the agents (e.g., TCAM manager 912) can program the complementary pair of NAT rules in a second TCAM (e.g., NAT TCAM 138, FIG. 1). Processing can return to the top of processing loop A to process the next received ACL.

Although the processing shown in FIG. 10 describes programming the TCAM's in nested loops, it will be appreciated that in other embodiments, the TCAMs can be programmed as concurrent operations because they are separate memories. Accordingly, in some embodiments, the programming loops can execute in parallel.

Further Examples

In accordance with the present disclosure, a method includes: receiving an ingress packet; identifying a first matched rule from among a plurality of rules stored in a first memory using information contained in the received packet, wherein each of the plurality of rules is associated with an identifier; identifying a second matched rule from among a plurality of rules stored in a second memory using both the information contained in the received packet and an identifier associated with the first matched rule; and producing an egress packet by rewriting the received packet in accordance with a rewrite action associated with the second matched rule.

In some embodiments, the plurality of rules in the first memory correspond to an access control list (ACL) and the plurality of rules in the second memory correspond to a network address translation (NAT) mapping, wherein the ACL identifies ingress packets to be translated according to the NAT mapping, wherein the received packet is an ingress packet that is identified by the ACL to be translated according to the NAT mapping.

In some embodiments, the method further includes storing the identifier associated with the first matched rule in a data store, wherein identifying the second matched rule includes using the information contained in the received packet and the identifier stored in the data store as criteria for searching the plurality of rules stored in the second memory.

In some embodiments, subsets of the plurality of rules in the first memory correspond to respective ACLs, wherein rules in each of the subsets are associated with an identifier of the corresponding ACL, wherein each rule in the second memory includes the identifier of one of the ACLs as a match criterion.

In some embodiments, the plurality of rules in the first memory correspond to filters in an ACL, wherein each filter in the ACL is associated with a pair of complementary rules among the plurality of rules in the first memory. In some embodiments, each complementary pair of rules among the plurality of rules in the first memory includes a forward filter rule to match packets transmitted in a forward direction between a first node and a second node and a reverse filter rule to match packets that are transmitted in a reverse direction between the first and second nodes.

In some embodiments, rewriting the received packet includes changing an IP address of the received packet to an IP address associated with the rewrite action that is associated with the second matched rule.

In accordance with the present disclosure, a method includes: receiving a network address translation (NAT) mapping that specifies translating packets containing a first IP address to replace the first IP address with a second IP address; receiving an access control list (ACL) comprising a plurality of filters, each filter specifying an IP address; generating a plurality of first rules from the filters comprising the ACL, each of the first rules associated with an identifier that identifies the ACL; and generating a plurality of second rules from the NAT mapping, each of the second rules associated with the identifier that identifies the ACL, wherein when an ingress packet matches one of the first rules and one of the second rules, the ingress packet is translated in accordance with said one of the second rules, wherein only ingress packets containing an IP address specified by one of the filters in the ACL are translated according to the NAT mapping.

In some embodiments, generating the plurality of second rules from the NAT mapping further includes adding the identifier of the ACL as a match criterion in the forward-direction translation rule and the reverse-direction translation rule.

In some embodiments, the method further includes storing the plurality of first rules in a first memory and storing the plurality of second rules in a second memory different from the first memory. In some embodiments, the first memory is a first ternary content-addressable memory (TCAM) and the second memory is second TCAM separate from the first TCAM. In some embodiments, the first memory is a TCAM and the second memory is an associative memory separate from the TCAM.

In some embodiments, the method further includes, when an ingress packet matches a rule among the plurality of first rules, then storing the identifier associated with the matched rule in a data store, wherein information contained in the ingress packet and the data store are used as search criteria to search for a matching rule among the plurality of second rules.

In accordance with the present disclosure, a network device includes: a first port; a second port; and pipeline processing logic comprising a first rules data store and a second rules data store separate from the first rules data store, the first rules data store and the second rules data store having stored therein rules to support network address translation of packets. The pipeline processing logic is configured to: receive a packet on the first port; provide the received packet to the first rules data store to identify a first matched rule in the first rules data store using information contained in one or more data fields of the received packet; provide the received packet to the second rules data store to identify a second matched rule in the second rules data store using information contained in the first matched rule and information contained in the one or more data fields of the received packet; translate an address in the received packet according to a translation action in the second matched rule; and transmit the translated received packet on the second port.

In some embodiments, the network device further comprises a metadata data store, wherein the pipeline processing logic is further configured to store the metadata contained in the first matched rule to the metadata data store, wherein the second matched rule is identified using information contained in the metadata data store and information contained in the one or more data fields of the received packet.

In some embodiments, the first rules data store comprises one or more sets of rules, each set of rules corresponding to a respective access control list (ACL), wherein rules in each set of rules are associated with metadata that identifies the corresponding ACL, wherein identifying the second matched rule is based on the ACL metadata associated with the first matched rule.

In some embodiments, rules in the first rules data store correspond to an ACL and the rules in the second rules data store correspond to a network address translation (NAT) mapping, wherein only ingress packets that are identified by the ACL are translated according to the NAT mapping, wherein the received packet is an ingress packet that is identified by the ACL and translated according to the NAT mapping.

In some embodiments, rules in the first rules data store correspond to filters in an ACL, wherein each rule includes an identifier of its corresponding ACL, wherein rules in the second rules data store correspond to a NAT mapping, wherein each rule in the second rules data store includes the ACL identifier as a match criterion.

In some embodiments, the first rules data store is a ternary content addressable memory (TCAM).

In some embodiments, the second rules data store is a TCAM or an associative memory.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A method comprising:
receiving an ingress packet;
identifying a first matched rule from among a first plurality of rules stored in a first memory using information contained in the received packet, wherein each of the first plurality of rules belongs to an access control list (ACL) and includes a first identifier that identifies the ACL to which it belongs;
outputting the first identifier from the first memory to be used at a second memory, said first memory stored in a first location and said second memory stored in a second location separate from the first location;
then identifying a second matched rule from among a second plurality of rules stored in the second memory using both the information contained in the received packet and the first identifier included in the first matched rule that identifies the ACL to which the first matched rule belongs; and
producing an egress packet by rewriting the received packet in accordance with a network address translation mapping contained in the second matched rule such that only packets matching a first one of the first plurality of rules and a second one of the second plurality of rules are rewritten.

2. The method of claim 1, wherein the second plurality of rules in the second memory correspond to a network address translation (NAT) mapping, wherein the ACL identifies ingress packets to be translated according to the NAT mapping.

3. The method of claim 1, further comprising storing the first identifier associated with the first matched rule in a first data store, wherein identifying the second matched rule includes using the information contained in the received packet and the first identifier stored in the first data store as criteria for searching the second plurality of rules stored in the second memory.

4. The method of claim 1, wherein subsets of the first plurality of rules in the first memory correspond to respective ACLs, wherein rules in each of the subsets are associated with the first identifier of the corresponding ACL, and wherein each rule in the second memory includes the first identifier of one of the ACLs as a match criterion.

5. The method of claim 1, wherein the first plurality of rules in the first memory correspond to filters in an ACL, wherein each filter in the ACL is associated with a pair of complementary rules among the first plurality of rules in the first memory.

6. The method of claim 5, wherein each complementary pair of rules among the first plurality of rules in the first memory includes a forward filter rule to match packets transmitted in a forward direction between a first node and a second node and a reverse filter rule to match packets that are transmitted in a reverse direction between the first node and the second node.

7. The method of claim 1, wherein rewriting the received packet includes changing an Internet Protocol (IP) address of the received packet to an IP address associated with the rewrite action that is associated with the second matched rule.

8. The method of claim 1, wherein the first memory is a first ternary content-addressable memory (TCAM) and the second memory is second TCAM separate from the first TCAM.

9. A method comprising:
receiving a network address translation (NAT) mapping that specifies translating first Internet Protocol (IP) addresses to corresponding second IP addresses;
receiving an access control list (ACL) comprising a plurality of filters, each filter specifying an IP address;
generating a plurality of first rules from the filters of the ACL, each of the plurality of first rules including a first identifier that identifies the ACL;
outputting the first identifier from a first memory to be used at a second memory, said first memory stored in a first location and said second memory stored in a second location separate from the first location; and
then generating a plurality of second rules from the NAT mapping, each of the plurality of second rules including the first identifier that identifies the ACL,
wherein when an ingress packet matches one of the plurality of first rules and one of the plurality of second rules, the ingress packet is translated in accordance with said one of the plurality of second rules, wherein only ingress packets containing an IP address specified by one of the filters in the ACL are translated according to the NAT mapping.

10. The method of claim 9, wherein generating the plurality of second rules from the NAT mapping further includes including the first identifier of the ACL as a match criterion in the plurality of second rules.

11. The method of claim 9, wherein the first memory is a first ternary content-addressable memory (TCAM) and the second memory is second TCAM separate from the first TCAM.

12. The method of claim 9, wherein the first memory is a TCAM and the second memory is an associative memory separate from the TCAM.

13. The method of claim 9, further comprising, when the ingress packet matches a rule among the plurality of first rules, then storing the first identifier associated with the first matched rule in a data store, wherein information contained in the ingress packet and the data store are used as search criteria to search for a second matching rule among the plurality of second rules.

14. A network device comprising:
a first physical port;
a second physical port;
a first rules data store comprising a first memory to store a plurality of first filter rules, wherein each first rule includes a first identifier that identifies an access control list (ACL) to which said each first rule belongs;
a second rules data store comprising a second memory separate from the first memory to store a plurality of second NAT rules, wherein the plurality of second rules comprises a network address translation (NAT) mapping; and
pipeline processing logic configured to:
receive a packet on the first physical port;
provide the received packet to the first rules data store to identify a first matched rule in the first rules data store using information contained in one or more data fields of the received packet;
output the first identifier from the first memory to be used at the second memory;
then provide the received packet to the second rules data store to identify a second matched rule in the second rules data store using the first identifier contained in the first matched rule that identifies the ACL to which the first matched rule belongs and the information contained in the one or more data fields of the received packet;
translate an IP address in the received packet according to a translation action in the second matched rule; and
transmit the translated received packet on the second physical port.

15. The network device of claim 14, wherein the network device further comprises a metadata data store, wherein the pipeline processing logic is further configured to store ACL metadata contained in the first matched rule to the metadata data store, wherein the second matched rule is identified using information contained in the metadata data store and the information contained in the one or more data fields of the received packet.

16. The network device of claim 14, wherein the first rules data store comprises one or more sets of rules, each set of rules corresponding to a respective access control list (ACL), wherein rules in each set of rules are associated with metadata that identifies the corresponding ACL, wherein identifying the second matched rule is based on the ACL metadata associated with the first matched rule.

17. The network device of claim 14, wherein rules in the first rules data store correspond to an ACL, wherein only ingress packets that are identified by the ACL are translated according to the NAT mapping, wherein the received packet is an ingress packet that is identified by the ACL and translated according to the NAT mapping.

18. The network device of claim 14, wherein rules in the first rules data store correspond to filters in an ACL, wherein each rule includes the first identifier of its corresponding ACL, wherein each rule in the second rules data store includes the first identifier as a match criterion.

19. The network device of claim 14, wherein the first rules data store is a ternary content addressable memory (TCAM).

20. The network device of claim 14, wherein the second rules data store is a TCAM or an associative memory.

* * * * *